(12) United States Patent
Bhongale et al.

(10) Patent No.: US 10,801,271 B2
(45) Date of Patent: Oct. 13, 2020

(54) LASER INDUCED GRAPHENE COATED OPTICAL FIBERS

(71) Applicant: Halliburton Energy Services, Inc., Houston, TX (US)

(72) Inventors: Satyan Gopal Bhongale, Cypress, TX (US); Daniel Joshua Stark, Houston, TX (US); Etienne Samson, Cypress, TX (US); Li Gao, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/315,990

(22) PCT Filed: Sep. 30, 2016

(86) PCT No.: PCT/US2016/054993
§ 371 (c)(1),
(2) Date: Jan. 7, 2019

(87) PCT Pub. No.: WO2018/063392
PCT Pub. Date: Apr. 5, 2018

(65) Prior Publication Data
US 2019/0136639 A1    May 9, 2019

(51) Int. Cl.
*G02B 6/44*    (2006.01)
*G02B 6/02*    (2006.01)
(Continued)

(52) U.S. Cl.
CPC ............ *E21B 17/003* (2013.01); *E21B 47/00* (2013.01); *G01D 5/268* (2013.01); *G01N 21/00* (2013.01);
(Continued)

(58) Field of Classification Search
CPC ... E21B 17/003; E21B 47/00; G02B 6/02395; G02B 6/4415; G02B 6/4479;
(Continued)

(56) References Cited

U.S. PATENT DOCUMENTS 5,824,026 A    10/1998    Diaz
7,548,681 B2    6/2009    Rubinstein
(Continued)

FOREIGN PATENT DOCUMENTS

| KR | 1020110039137 A | 4/2011 |
|----|-----------------|--------|
| WO | 2015171111 | 11/2015 |
| WO | 2015175060 A2 | 11/2015 |

OTHER PUBLICATIONS

International Search Report and Written Opinion dated Feb. 27, 2017; International PCT Application No. PCT/US2016/054993.
(Continued)

*Primary Examiner* — John Bedtelyon
(74) *Attorney, Agent, or Firm* — McGuireWoods LLP (57) ABSTRACT

The disclosed embodiments include an optical fiber having a graphene coating, a method to apply a graphene coating onto an optical fiber, and a fiber optic cable having a graphene coating. In one embodiment, the optical fiber includes an optical core that extends along a longitudinal axis. The optical fiber also includes a carbon based coating that covers the optical core along the longitudinal axis. The optical fiber also includes a layer of graphene formed on a first surface of the carbon based coating. The layer of graphene is formed from a laser induction process that includes focusing a laser beam at the carbon based coating to photothermally convert the first surface of the carbon based coating into graphene.

20 Claims, 6 Drawing Sheets

(51) Int. Cl.
| | |
|---|---|
| *E21B 17/00* | (2006.01) |
| *G01N 21/00* | (2006.01) |
| *E21B 47/00* | (2012.01) |
| *G01D 5/26* | (2006.01) |
| *H01G 11/08* | (2013.01) |
| *H01G 11/10* | (2013.01) |
| *H01G 11/36* | (2013.01) |
| *H01G 11/86* | (2013.01) |

(52) U.S. Cl.
CPC .......... *G02B 6/02395* (2013.01); *G02B 6/443* (2013.01); *G02B 6/4415* (2013.01); *G02B 6/4479* (2013.01); *H01G 11/08* (2013.01); *H01G 11/10* (2013.01); *H01G 11/36* (2013.01); *H01G 11/86* (2013.01)

(58) Field of Classification Search
CPC .......... G02B 6/443; G02B 6/02; G01N 21/00; G01D 5/268; H01G 11/08; H01G 11/10; H01G 11/36; H01G 11/86
See application file for complete search history.

(56) References Cited

U.S. PATENT DOCUMENTS

| | | |
|---|---|---|
| 9,074,988 B2 | 7/2015 | Jaaskelainen |
| 9,410,246 B2 * | 8/2016 | Winarski ............ H01S 3/06733 |
| 2010/0296782 A1 | 11/2010 | Nikolin et al. |
| 2011/0222562 A1 | 9/2011 | Jiang et al. |
| 2011/0285999 A1 | 11/2011 | Kim et al. |
| 2012/0288227 A1 | 11/2012 | Kim et al. |
| 2014/0158877 A1 | 6/2014 | Wysocki et al. |
| 2015/0205040 A1 | 7/2015 | Winarski |
| 2019/0088420 A1 * | 3/2019 | Tour ...................... H01M 4/587 |

OTHER PUBLICATIONS

Lin, Jian, et al. "Laser-induced porous graphene films from commercial polymers." Nature communications 5 (2014): 5714.
Jariwala, Deep, et al. "Gate-tunable carbon nanotube-MoS2 heterojunction pn diode," Proceedings of the National Academy of Sciences (2013): 201317226.
Britnell, Liam, et al. "Strong light-matter interactions in heterostructures of atomically thin films." Science 340.6138 (2013): 1311-1314.
Britnell, L., et al. "Field-effect tunneling transistor based on vertical graphene heterostructures." Science 335.6071 (2012): 947-950.
Lee, Gwan-Hyoung, et al. "Flexible and transparent MoS2 field-effect transistors on hexagonal boron nitride-graphene heterostructures." ACS nano 7.9 (2013): 7931-7936.
Liu, Zheng, et al. "In-plane heterostructures of graphene and hexagonal boron nitride with controlled domain sizes." Nature nanotechnology 8.2 (2013): 119.
Dean, Cory R., et al. "Boron nitride substrates for high-quality graphene electronics." Nature nanotechnology 5.10 (2010): 722-726.
Neves, A. I. S., et al. "Transparent conductive graphene textile fibers." Scientific Reports 5 (2015): 9866.
Peng, Zhiwei, et al. "Flexible and stackable laser-induced graphene supercapacitors." ACS applied materials & interfaces 7.5 (2015): 3414-3419.
Fan, Yingcai, et al. "Tunable electronic structures of graphene/boron nitride heterobilayers." Applied Physics Letters 98.8 (2011): 083103.
Cruz-Silva, Rodolfo, et al. "Super-stretchable graphene oxide macroscopic fibers with outstanding knotability fabricated by dry film scrolling." ACS nano 8.6 (2014): 5959-5967.
Li, Qi, et al. "Flexible high-temperature dielectric materials from polymer nanocomposites." Nature 523.7562 (2015): 576.

* cited by examiner

LASER INDUCED GRAPHENE COATED OPTICAL FIBERS

BACKGROUND

The present disclosure relates generally to optical fibers and fiber optic cables having a graphene coating, and to methods to assemble optical fibers and fiber optic cables having a graphene coating.

Optical fibers are sometimes used in a wellbore to facilitate fiber optic communications with downhole tools and devices and for optical sensing of the downhole environment. For example, optical fibers may be used as sensors to measure the temperature, pressure, vibration, displacement, velocity, torque, acceleration, as well as other properties of the downhole environment. Optical fibers may also be deployed in many telemetry systems and may be used to transmit signals indicative of commands to downhole tools and instruments, and to transmit signals indicative of downhole measurements as well as signals indicative of other data obtained by downhole tools to the surface.

Optical fibers that are disposed in wellbores are often exposed to hostile environments where the temperature can reach over 350° F., pressure can reach over 20 kpsi, and contaminates such as chemicals that erode optical fibers are abundantly present. At high temperatures, hydrogen ions, which are abundantly present in wellbores, may penetrate protective coverings of the optical fibers, and interact with optical core components of the optical fibers, which are typically made from silica. The hydrogen ions may bind to the silica to form SiOH, which has a much higher optical attenuation than silica. This adverse condition is known as "hydrogen darkening." Hydrogen darkening significantly degrades optical properties of the optical fibers, thereby costing oil and gas companies millions of dollars to repair or replace degraded optical fibers. Further, optical fibers are sometimes deployed in a well for the life expectancy of the well, which may be several decades. In such circumstances, the material properties of deployed optical fibers should not significantly degrade while the well remains in service.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

The illustrated figures are only exemplary and are not intended to assert or imply any limitation with regard to the environment, architecture, design, or process in which different embodiments may be implemented.

DETAILED DESCRIPTION OF ILLUSTRATIVE EMBODIMENTS

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

The present disclosure relates to optical fibers and fiber optic cables having a graphene coating and methods to apply graphene coating onto optical fibers and fiber optic cables. An optical fiber includes an optical core manufactured from a type of silica or plastic. In some embodiments, the optical fiber also includes a cladding that surrounds the optical core. In further embodiments, the optical fiber may be a multi core fiber, photonic crystal fiber, disordered fiber, doped fiber, or any silica or polymer based fiber that may be used as a wave guide for light propagation. The cladding is surrounded by a carbon based coating that protects the optical core from adverse environmental conditions and contaminates that may degrade or damage the optical core. In some embodiments, the carbon based coating is formed from polyimides, polyetherimides, or other polymers with aromatic and imide repeat units.

A layer of graphene is formed on the carbon based coating to further protect the optical fiber from adverse environmental conditions and contaminates. In some embodiments, a laser induction process is used to focus a laser (e.g., a carbon dioxide laser) at the carbon based coating. The laser photothermally converts a layer of the carbon based coating into graphene. In other embodiments, graphene may also be formed on the carbon based coating via chemical vapor deposition or liquid deposition techniques. In further embodiments, preformed graphene may be applied to the optical fiber directly. The layer of graphene acts as a barrier against hydrogen ions, which are abundantly present in a hydrocarbon rich environment, such as a wellbore.

The layer of graphene may also be electrically conductive. In some embodiments, the layer of graphene forms a conductive path that connects one or more power sources to downhole electronic components. In one of such embodiments, the layer of graphene is operable to transmit an alternating current or a direct current downhole to power downhole electronic components. In another one of such embodiments, the layer of graphene is surrounded by an insulating layer. In further embodiments, electrical components, such as capacitors, supercapacitors, transistors, resistors, diodes, and the like may be formed by forming graphene electrode patterns on the carbon based coating. In one of such embodiments, the optoelectronic properties of the graphene allow electronic components to be formed on the layer of graphene without additional opto-electronic interfaces between the optical core and the electronic components formed on the graphene. In one of such embodiments, the electrical components are combined to form a power source. The capacitor and supercapacitor components of the power source are charged at the surface before the power source is deployed downhole provide power to downhole tools and to recharge downhole power sources. The electrical components may also form sensors that measure the wellbore environment to provide temperature, pressure, pH, or other conditions of the wellbore environment. In further embodiments, additional layers of materials, such as boron nitride, molybdenum disulfide ($MOS_2$), silicone layered transition metal dichalcogenides, and germanene layered transition metal dichalcogenides may be disposed proximate to the layer of graphene to form the electrical components discussed herein.

One or more intermediary layers may be added to enhance the physical properties of the optical fiber. For example, the intermediary layers may have material properties that strengthen the optical fiber, enhance the resilience of the optical fiber, resist or protect the optical fiber from adverse conditions such as heat and pressure, shield the optical fiber from contaminates, or any combination thereof. In some embodiments, one or more intermediary layers may form insulators to insulate the optical core from conductive layers and/or semi-conductive layers of the optical fiber, or to insulate different conductive layers and/or semi-conductive layers of the optical fiber from each other. In further embodiments, at least one of the one or more intermediary layers may also form a buffer layer that separates the graphene layer from the optical core, cladding, or other graphene layers. In some embodiments, multiple layers of graphene are formed around the optical core. In one of such embodiments, one or more having insulating or semiconducting properties are formed around the optical core and in between optical core and the graphene layers to isolate the optical core from the graphene layers.

Figure 1A:
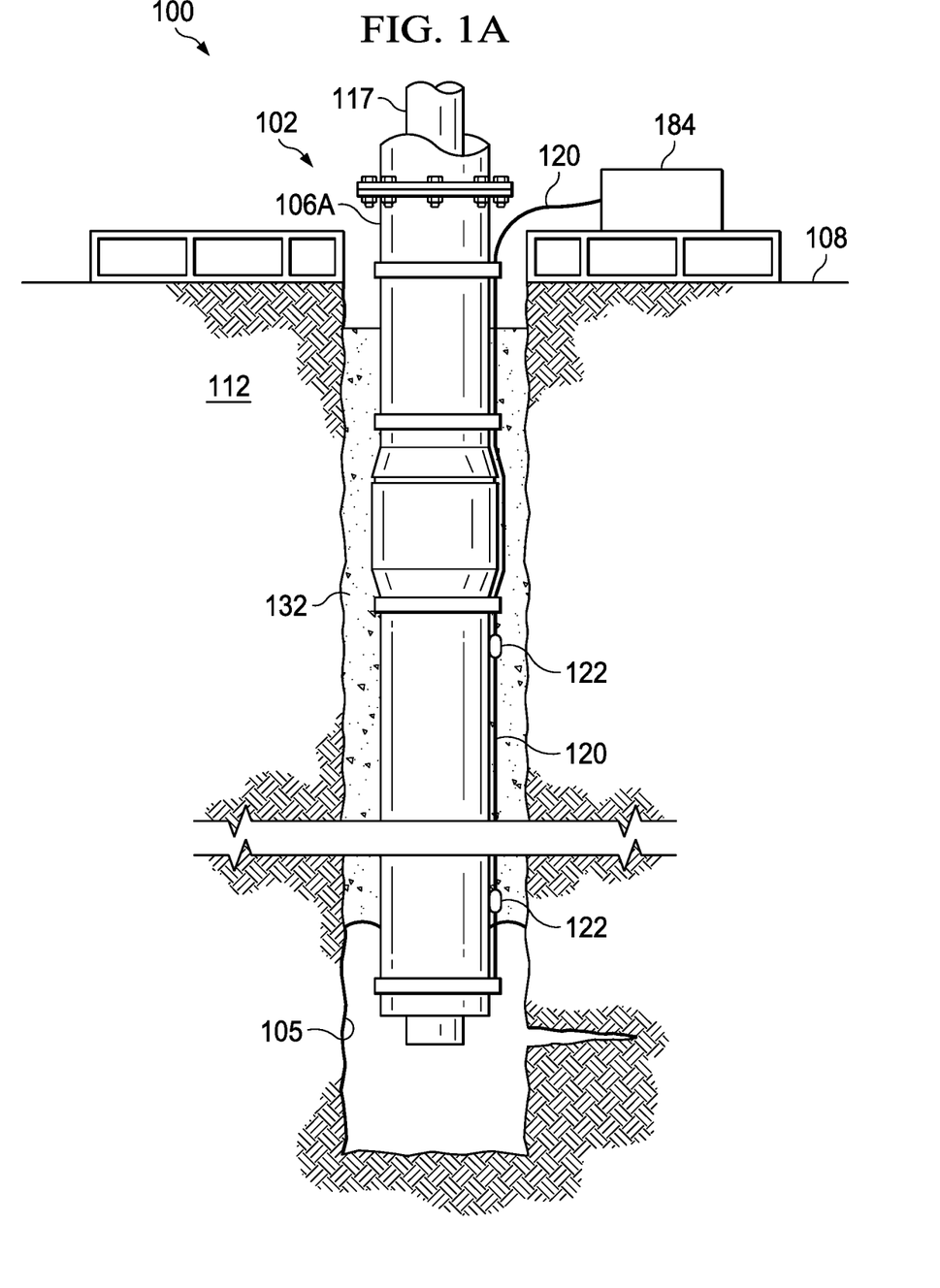
FIG. 1A illustrates a schematic view of a production environment in which an optical fiber is deployed along an exterior surface of a production casing to facilitate fiber optic communications with downhole tools and devices and for optical sensing of the downhole environment.

Now turning to the figures, FIG. 1A illustrates a production environment 100 in which an optical fiber 120 is deployed along an exterior surface of a production casing 106A that to facilitate fiber optic communications with downhole tools and devices and for optical sensing of the downhole environment. In the embodiment of FIG. 1A, well 102 includes a wellbore 105, which extends from a surface 108 of the well 102 to or through a subterranean formation 112. The production casing 106A extends from a surface 108 of well 102 down wellbore 105 to insulate downhole tools and strings deployed in the production casing 106A as well as hydrocarbon resources flowing through production casing 106A from the surrounding subterranean formation 112, to prevent cave-ins, and/or to prevent contamination of the surrounding subterranean formation 112. A cement sheath 132 is deposited along an annulus between the wellbore and the production casing 106A to set the production casing 106A and to form a barrier that seals the production casing 106A. The optical fiber 120 is fitted with sensors 122 and extends along the production casing 106A down the wellbore 105. A string 117 is deployed in an annulus of the production casing 116A. In some embodiments, the string is a production string that that provides an annulus for wellbore fluids to travel down the wellbore 105 and for hydrocarbon resources to travel up the wellbore 105. In such embodiments, the optical fiber 120 is operable to provide semi-permanent and/or permanent monitoring of the downhole environment. In other embodiments, the string is a wireline tool string, a slickline tool string, or another type of tool string operable to deploy the sensors, tools, as well as other downhole electronic devices during the operation of the well 102. In one of such embodiments, the optical fiber 120 is operable to detect signals indicative of measurements from the sensors, tools, and downhole electronic devices, and to transmit the detected signals along the optical fiber 120 to the surface 108. In the embodiment of FIG. 1, the optical fiber 120 is directly connected to controller 184, which includes any electronic device operable to receive and/or provide for display information indicative of signals transmitted by the optical fiber 120. In further embodiments, signals transmitted along the optical fiber 120 are relayed by another device or telemetry system to the controller 184.

Figure 1B:
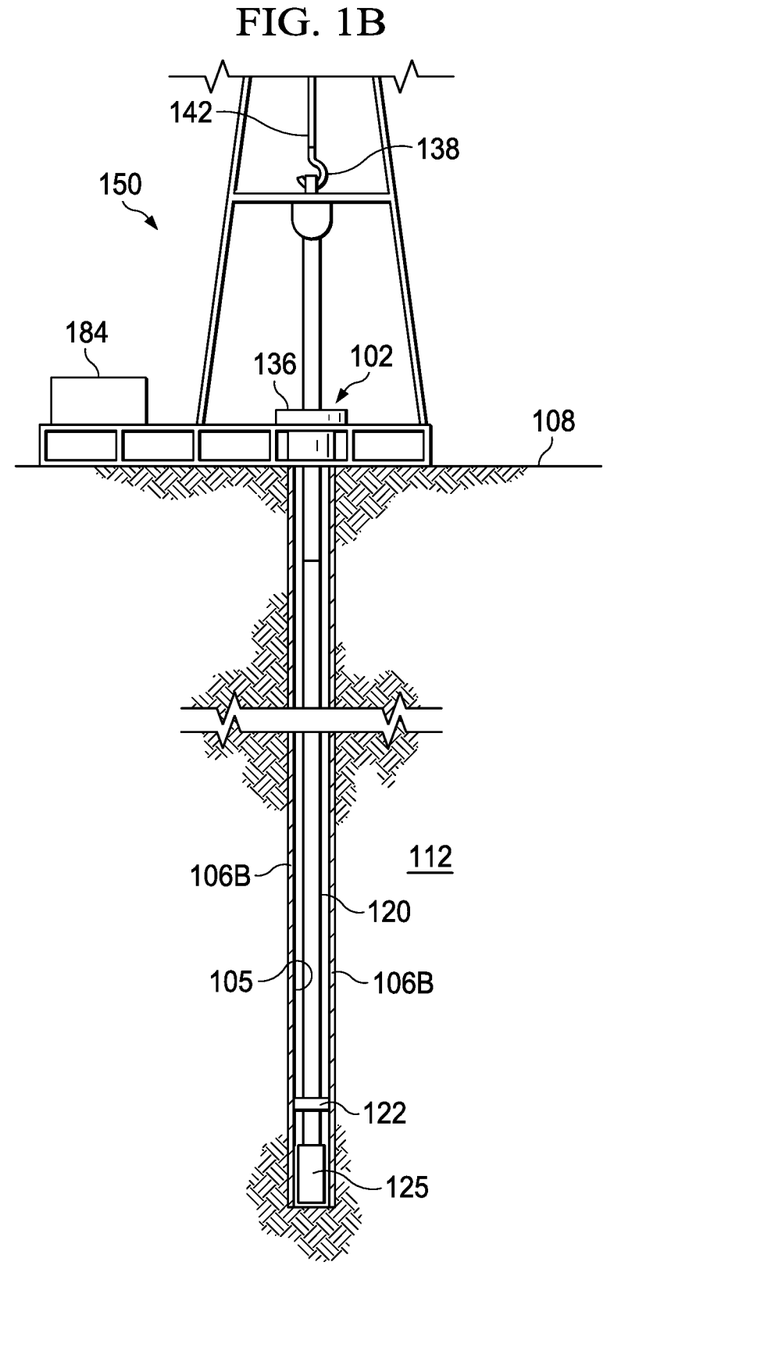
FIG. 1B is a wireline logging environment in which an optical fiber is deployed in a wellbore of a well to facilitate fiber optic communications with downhole tools and devices and for optical sensing of the downhole environment.

FIG. 1B illustrates a schematic view of a wireline logging environment 150, in which the optical fiber 120 is deployed in an annulus of a production casing 106B deployed in the wellbore 105 of the well 102 to facilitate fiber optic communications with downhole tools and devices and for optical sensing of the downhole environment. A hook 138, cable 142, traveling block (not shown), and hoist (not shown) are provided to lower the optical fiber 120 down the wellbore 105 or to lift the optical fiber 120 up from the wellbore 105. In other embodiments, the optical fiber 120 is enclosed in a casing and is deployed downhole through a feedthrough system in combination with spools and slip rings. The optical fiber 120, may also be deployed in other production or preparation environments, such as logging while drilling and measurement while drilling environments. In some embodiments, the optical fiber 120 is deployed with the tool string 117. In other embodiments, multiple optical and/or electrical fibers are encapsulated within a fiber optic cable that is deployed with the tool string 117. Further, although FIGS. 1A and 1B illustrate deploying optical fiber 120 in downhole environments of on shore wells, the optical fiber 120 may also be deployed in subsea environments such as in offshore wells, along subterranean formations (underground fiber optic cable lines), along the seafloor (underwater optic cable lines), or above ground (in fiber optic cable lines suspended by multiple tower or poles).

The optical fiber 120 is fitted with sensors 122 operable to make one or more types of downhole measurements. Further, the optical fiber 120 is also coupled to a logging tool 125. Additional descriptions of the optical fiber 120 are described in the following paragraphs and are illustrated in at least FIGS. 2-8. In some embodiments, the optical fiber 120 may be utilized to perform distributed sensing of various conditions of wellbore 105 and to transmit measurements of the conditions to the controller 184. In further embodiments, one or more electrical components formed on the optical fiber are operable to measure the conditions of the wellbore 105. Measurements made by the sensors 122, the optical fiber, and electrical components formed on the optical fiber 120 may be transmitted via an optical core (not shown) of the optical fiber 120 to the controller 184. Similarly, communications with the sensors 122 and the logging tool 125 are transmitted via the optical core of the optical fiber 120 to the controller 184.

The optical fiber 120 also includes a carbon based coating and a layer of graphene. In some embodiments, electrical components, such as capacitors, supercapacitors, transistors, diodes, resistors and the like are formed on the carbon based coating. In further embodiments, the electrical components are formed on one or more intermediary layers of materials that are disposed proximate to the graphene layer. In some embodiments, the electrical components form a power source to provide power to the sensors 122 and the downhole logging tool 125. In further embodiments, the electrical components form sensors operable to measure different wellbore conditions proximate to the electrical components.

Figure 2:
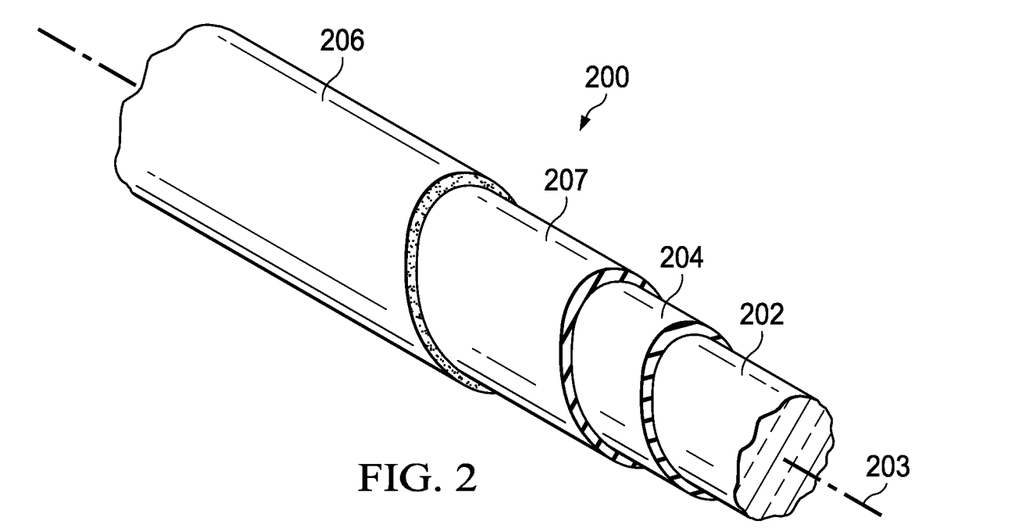
FIG. 2 illustrates a schematic, cross-sectional view of an optical fiber.

FIG. 2 illustrates a schematic, cross-sectional view of an optical fiber 200. The optical fiber 200 includes an optical core 202 that extends along a longitudinal axis 203 from a first end of optical fiber 200 to a second end of the optical fiber 200. The optical core 202 may be formed from a type of silica or plastic and is surrounded by a cladding 204, which is usually formed from a silica or plastic with lower index of refraction than the core to facilitate transmission of photons from the first end of the optical fiber 200 to the second end of the optical fiber 200. The carbon based coating 206 and the intermediary layer 207 wrap around the optical core 202 and the cladding 204. This carbon based coating protects the optical core and the cladding from various adverse conditions and contaminants discussed herein. Although the embodiment illustrated in FIG. 2 contains one intermediary layer 207, other embodiments may include no intermediary layer or multiple intermediary layers. In some embodiments graphene is formed on the carbon based polymer via one or more laser induction processes. Additional descriptions of different laser induction processes are described in the following paragraphs and are illustrated in at least FIGS. 3-8.

The graphene layer inhibits hydrogen ions as well as other contaminating atoms or molecules from penetrating the carbon based coating 206, thereby protecting the optical core 202 from hydrogen darkening. In some embodiments, the graphene layer forms a conductive path to provide power to downhole electronic components such as the sensors 122 and the downhole logging tool 125. Further, electronic components are formed and/or disposed on the graphene layer. In one of such embodiments, the intermediary layer 207 forms an insulating layer that shields the electronic components on the graphene layer from other components of the optical fiber 200. In further embodiments, the intermediary layer 207 enhances the material properties of the optical fiber 200. In some embodiments, a jacket (not shown) is added around the carbon based coating to further insulate the optical core 202.

Figure 3:
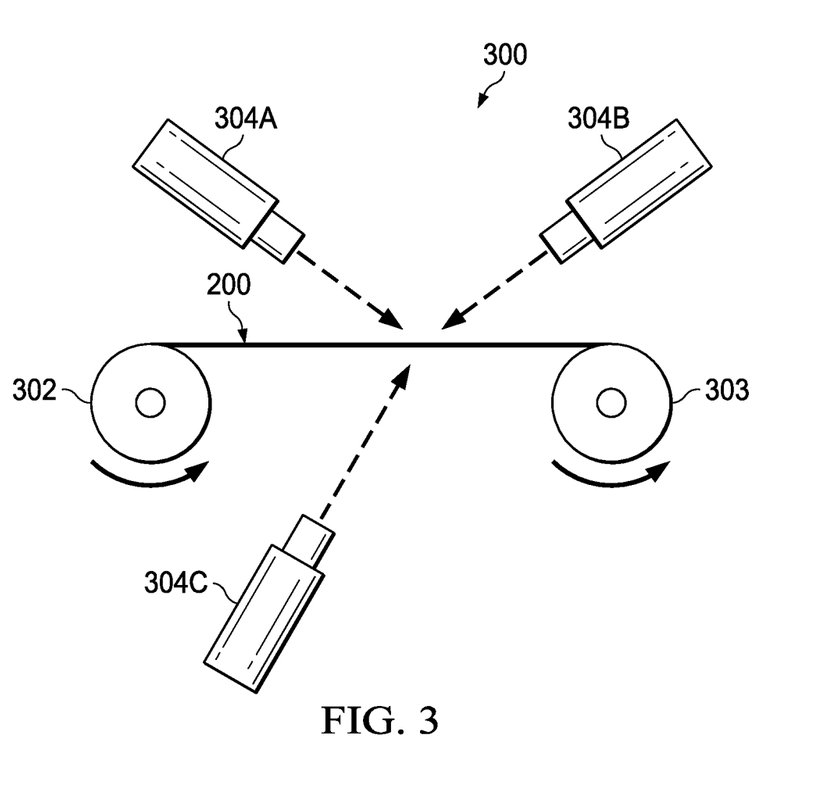
FIG. 3 illustrates a perspective view of a system for forming a graphene layer on the optical fiber of FIG. 2 via laser-induction.

FIG. 3 illustrates a perspective view of a system 300 for forming a graphene layer on the optical fiber 200 of FIG. 2 via laser-induction. The optical fiber 200 is wound from an optical fiber feed reel 302 to the optical fiber uptake reel 303. As the optical fiber 200 travels from the optical fiber feed reel 302 to the optical fiber uptake reel 303, laser beams are emitted from lasers 304A-C onto the carbon based coating of the optical fiber 200. In some embodiments, the laser beams may photothermally and/or photochemically convert a surface of the carbon based coating into graphene. In some embodiments, the laser beams convert carbon atoms of the carbon based coating from having an $sp^3$ hybridization to an $sp^2$ hybridization. In one of such embodiments, a $CO_2$ laser induces lattice vibrations at localized sections of the carbon based coating. The lattice vibrations increase the temperature at the localized sections of the carbon based coating. The temperature increase breaks C—O, C=O and N—C bonds of the localized sections of the carbon based coating. This process releases oxygen and nitrogen atoms and ions as gaseous compounds while the remaining carbon atoms and ions form a graphitic structure, which includes at least one layer of graphene. In some embodiments, the layer of graphene may be treated with manganese dioxide, ferric oxyhydroxide, polyaniline, poly(vinyl alcohol) (PVA) in $H_2SO_4$, or other similarly charged chemical to form a microsupercapacitor on the layer of graphene. In additional embodiments, the layer of graphene may be combined with other materials, such as $MoS_2$, hexagonal boron nitride, layered transition metal dichalcogenides to form field effect transistors, optical modulators, capacitors, microsupercapacitors, as well as other electronic components discussed herein. In further embodiments, pre-formed microsupercapacitors and other electronic components may be disposed on the layer of graphene.

In some embodiments, the lasers 304A-C are operable to rotate around the optical fiber 200 while the optical fiber 200 is drawn from the fiber feed reel 302 to the optical uptake reel 303 to form the layer of graphene and/or to form electronic components on the layer of graphene. In further embodiments, the optical fiber 200 may be rotated while the optical fiber 200 is drawn from the fiber feed reel 302 to the optical uptake reel 303 to form the graphene or to form electrical components on the layer of graphene. In some embodiments, the foregoing process described in the previous paragraphs and illustrated in FIG. 3 is repeated to form multiple layers of graphene. In one of such embodiments, after a first layer of graphene is formed by the lasers 304A-C, an additional layer of carbon based coating is applied to the optical fiber 200. The optical fiber 200 containing the additional layer is then wound around the fiber feed reel 302 and is drawn from the fiber feed reel 302 to the optical uptake reel 303. As the optical fiber 200 travels from the optical fiber feed reel 302 to the optical fiber uptake reel 303, laser beams are emitted from the lasers 304A-C onto the second layer of carbon based coating to photothermally convert a surface of the second layer of carbon based coating into a second layer of graphene. In some embodiments, additional electrical components are formed on the second layer of graphene. Additional descriptions of processes for forming electrical components on graphene are provided herein.

Figure 4:
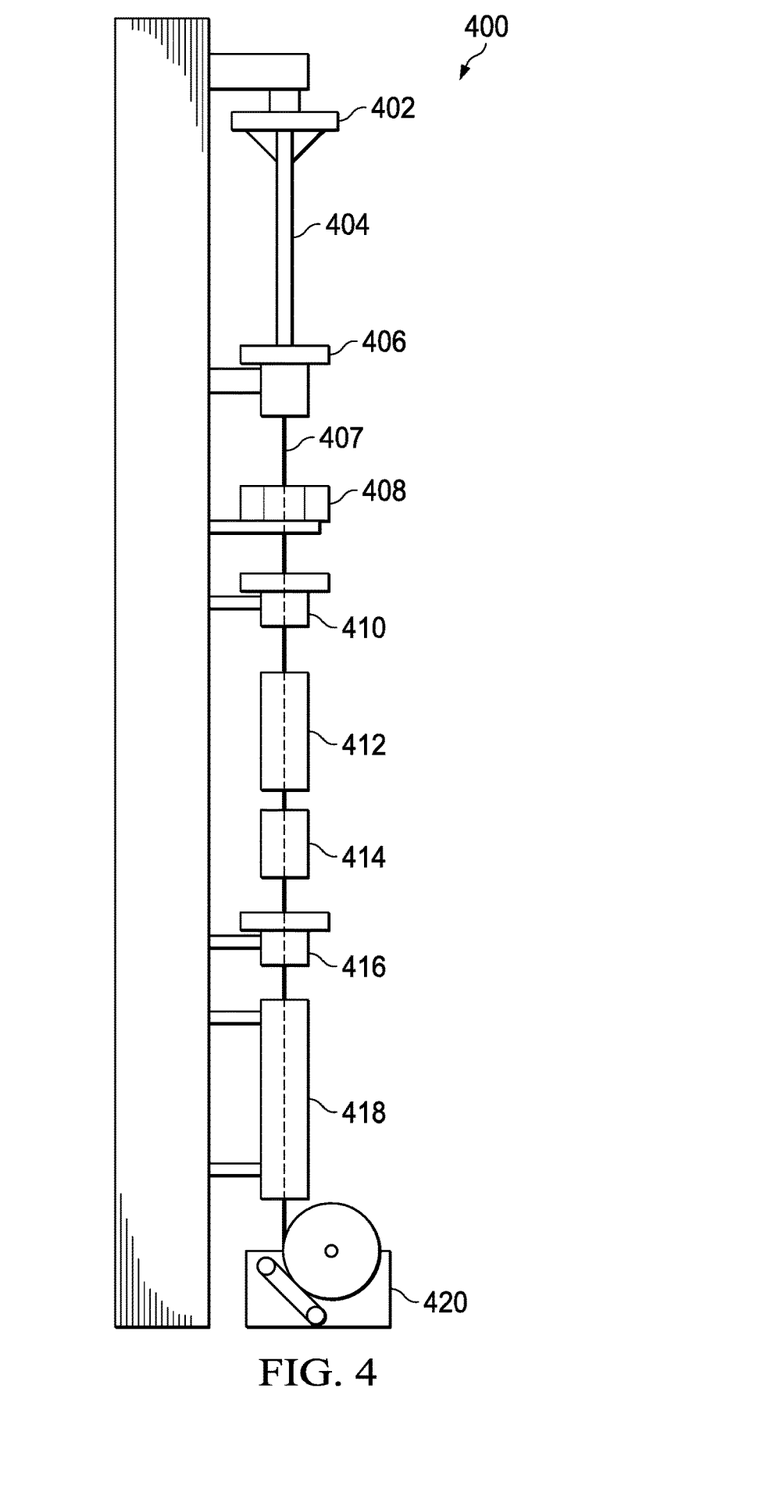
FIG. 4 illustrates a perspective view of a system for forming a graphene layer on a fiber optic preform via laser-induction.

FIG. 4 illustrates a perspective view of a system 400 for forming a graphene layer on a fiber optic preform via laser-induction. A preform feed 402 may hold the preform 404. In some embodiments, the preform 404 is formed from silica or plastic and includes materials that form the optical core and cladding of an optical fiber. The preform 404 may be drawn through a furnace 406, which melts the preform 404 to form an optical fiber 407. A sensor, such as a laser micrometer 408 may measure the diameter of the optical fiber 407 and adjust the draw rate to ensure the optical fiber 407 has a desired uniform thickness. The optical fiber 407 may be pulled through a first coating cup 410 containing material for a carbon based coating. Once a coating of carbon based polymer is applied to the optical fiber 407, the optical fiber 407 passes through a first curing oven 412 to cure the carbon based coating. As the optical fiber 407 passes by a laser system 414, a laser beam generated by the laser system 414 focuses on the optical fiber 407 to photothermally convert a surface of the carbon based coating into a layer of graphene. The laser power may be adjusted to optimize the layer thickness, sheet resistance, domain size, atomic purity, and structural purity of the graphene element. The optical fiber 414, now with a grapheme element, may pass through a second coating cup 416 containing material for an additional coating, such as a buffer coating or a jacket. Once an additional layer of coating is applied, the optical fiber 407 passes through a second curing oven 418 to cure the additional coating. The optical fiber 407 is then retrieved from tractor 420.

The system illustrated in FIG. 4 produces an optical fiber having an optical core, a cladding, a carbon based coating having a layer of graphene, and an additional layer of coating. In some embodiments, the second coating cup 416 and the second curing oven 418 are not included in the system 400. In such embodiments, the optical fiber would include an optical core, a cladding, and a carbon based coating having a layer of graphene. In other embodiments, multiple intermediary layers of coatings are applied before or after a graphene layer is formed on the carbon based coating. In one of such embodiments, one or more intermediary layers may be layered on the fiber through chemical vapor deposition. In another one of such embodiments, one or more intermediary layers may be layered on the fiber through liquid deposition. In a further embodiment, one or more intermediary layers may be layered on the fiber through evaporation sputtering. In a further embodiment, one or more intermediary layers may be layered on the fiber through electrodeposition. In a further one of such embodiments, one or more intermediary layers may be layered on the fiber through electroplating. In further embodiments, multiple layers of graphene are applied to multiple layers carbon based coating. In further embodiments, microfabrication techniques such as, but not limited to dissolvable photoresist, wet chemical etching, and reactive ion etching may be performed to pattern the layer of graphene or one or more intermediary layers and to form electronic devices, such as capacitors, supercapacitors, transistors, resistors, diodes, and the like. In further embodiments, one or more pre-formed layers of graphene may be applied to the optical fiber during or after the foregoing process. In one of such embodiments, the one or more pre-formed layers of graphene are formed using one of the processes described herein. Additional techniques used to form electronic devices on the optical fiber are provided in further detail in the paragraphs below.

Figure 5:
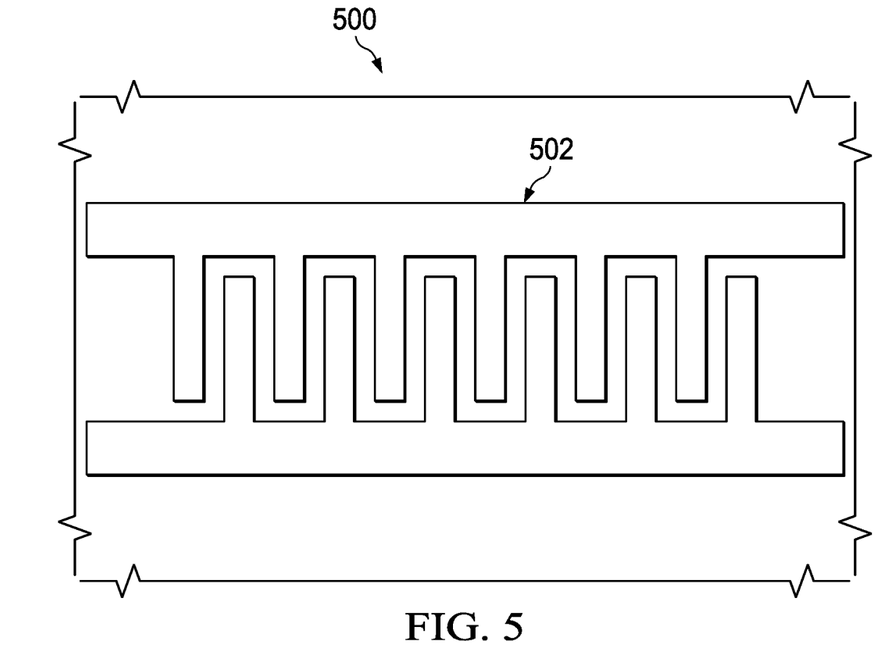
FIG. 5 illustrates a top down view of a layer of graphene electrolyte formed on a carbon based coating.

FIG. 5 illustrates a top down view of a layer of graphene electrolyte 502 formed on a carbon based coating 500. The lasers 304A-304C may form graphene electrode patterns on the carbon based coating of the optical fiber 200. Positive and negative charges are arranged on different graphene electrodes through exposure to electrolytes (aqueous or solid state) or to exposure to different voltages. A capacitor may then be formed by separating the charged electrodes. In other embodiments, the lasers 304A-304C form graphene arrays and electrodes are disposed on the graphene arrays to form capacitors. Through multiple layers of coatings, multiple layers of capacitors or capacitors orthogonal to the fiber surface may be formed. In some embodiments, the lasers 304A-C are operable to rotate around the optical fiber 200 while the optical fiber 200 is drawn from the fiber feed reel 302 to the optical uptake reel 303 to form patterns of electrolytes on the layer of graphene. In further embodiments, the optical fiber 200 may be rotated while the optical fiber 200 is drawn from the fiber feed reel 302 to the optical uptake reel 303 to form the graphene or to form the patterns of electrolytes on the layer of graphene.

Figure 6:
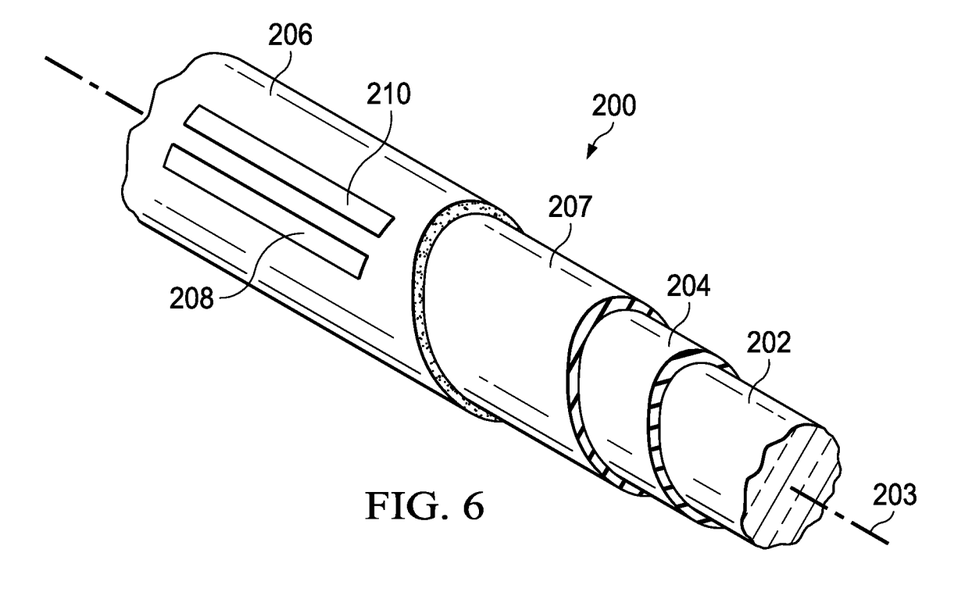
FIG. 6 illustrates a schematic, cross-sectional view of the optical fiber of FIG. 2, where electrical components are disposed on the layer of graphene of the optical fiber.

FIG. 6 illustrates a schematic, cross-sectional view of the optical fiber 200 of FIG. 2, where electrical components are disposed on the layer of graphene of the optical fiber. As described in FIG. 5, a laser induction process may be used to form different graphene arrays and electrode patterns that are be used to form capacitors 208. In some embodiments, the capacitors 208 form a power source to provide power to sensors and to downhole tools.

Further, transistors 210, diodes (not shown), resistors (not shown), as well as other electronics components may also be formed on the carbon based coating of the optical fiber via laser induction or some other fabrication process. In some embodiments, the electronic components form a sensor, such as, but not limited to, a temperature sensor, a pressure sensor, a resistivity sensor, an electromagnetic sensor, an acoustic sensor, a sensor operable to sense radioactive flux, a sensor operable to sense water content, or a pH sensor to measure the environment of the wellbore proximate to the electronic components. In some embodiments, additional layers of materials, such as boron nitride, molybdenum disulfide ($MOS_2$), silicone layered transition metal dichalcogenides, and germanene layered transition metal dichalcogenides may be disposed on the intermediary layer 207 to the electrical components discussed herein.

Figure 7:
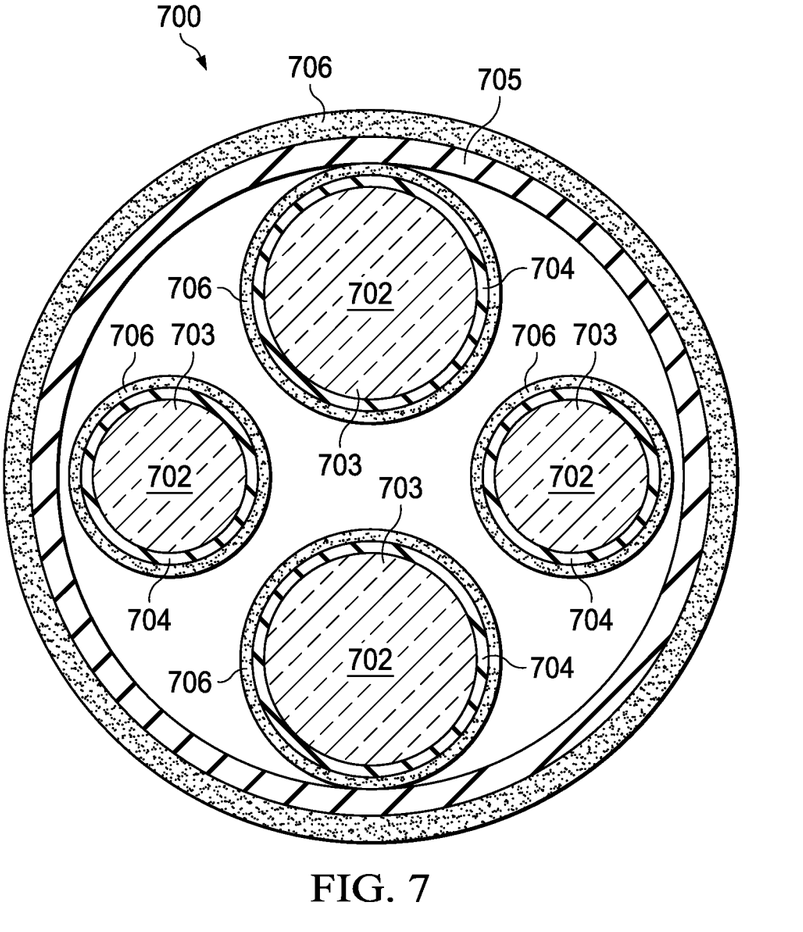
FIG. 7 illustrates a fiber optic cable having a plurality of optical fibers.

FIG. 7 illustrates a fiber optic cable 700 having a plurality of optical fibers 702. Each of the optical fibers 702 includes a fiber core 703, a cladding 704, and a carbon based coating 706. Each of the carbon based coatings 706 includes a graphene layer (not shown). In some embodiments, the graphene layers are formed on the carbon based coatings 706 via a laser induction process described herein. In other embodiments, the graphene layers are formed on the carbon based coatings 706 via chemical vapor deposition. In further embodiments, the graphene layers are formed on the carbon based coatings 706 via liquid deposition.

The optical fibers 702 are protected by an intermediary layer 705 and another carbon based coating 706. In some embodiments, the intermediary layer 705 enhances the material properties of fiber optic cable 700. In one of such embodiments, the intermediary layer 705 increases the resilience of the fiber optic cable. In other embodiments, the intermediary layer 705 prevents contaminates such as hydrogen atoms from reaching the optical fibers 702.

In some embodiments, the assembled stack of carbon based coatings may include more than two carbon based coatings. In one of such embodiments, a first surface and a second surface of a third carbon based coating are photothermally converted into a third layer and a fourth layer of graphene, respectively, where the first surface of the third carbon based coating is substantially opposite the second surface of the third carbon based coating. The third carbon based coating is inserted in between the first intermediary layer and the second carbon based polymer. Further, a second intermediary layer is inserted in between the second and third carbon based coatings to form a buffer layer between the two carbon based coatings. The first, second, and third carbon based coatings and the first and second intermediary layers are then assembled into a stack and assembled stack is applied to the optical core along the longitudinal axis of the optical core. Additional carbon based coatings and intermediary layers may be similarly added.

In other embodiments, carbon based coatings are applied to the optical core one layer at a time. In such embodiments, a graphene layer is formed on a surface of the most recently applied carbon based coating before a new layer of carbon based coating is applied to the optical core. In one of such embodiments, an intermediary layer is applied as a buffer between adjacent layers of graphene.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/processes may be performed in parallel or out of sequence, or combined into a single step/process. The scope of the claims is intended to broadly cover the disclosed embodiments and any such modification. Further, the following clauses represent additional embodiments of the disclosure and should be considered within the scope of the disclosure:

Clause 1, an optical fiber having a graphene coating, comprising an optical core extending along a longitudinal axis; a carbon based coating covering the optical core along the longitudinal axis; and a layer of graphene formed on a first surface of the carbon based coating, wherein the layer of graphene is electrically conductive, and wherein the layer of graphene is formed from a laser induction process comprising focusing a laser beam at the carbon based coating to photothermally convert the first surface of the carbon based coating into the layer of graphene.

Clause 2, the optical fiber of clause 1, further including a plurality of electrical components formed on the layer of graphene.

Clause 3, the optical fiber of clauses 1 or 2, wherein the plurality of electrical components form a power source to provide power to a downhole tool.

Clause 4, the optical fiber of any combination of claims 1-3, wherein the plurality of electrical components form sensor components to provide measurements of a downhole environment.

Clause 5, the optical fiber of any combination of clauses 1-4, wherein optical fiber of claim 4, wherein the sensor components are operable to measure at least one of a pressure, a temperature, a resistivity, an electromagnetic field strength and direction, an acoustic field strength, a radioactive flux, water content, and a pH of the downhole environment.

Clause 6, the optical fiber of any combination of clauses 1-5, further comprising an intermediary layer having material properties that strengthen the optical fiber.

Clause 7, the optical fiber of any combination of clauses 1-6, wherein the intermediary layer has insulating or semiconducting properties that isolate the optical core from one or more electrically conductive layers.

Clause 8, the optical fiber of any combination of the clauses 1-7, wherein the carbon based coating is formed from polyimides.

Clause 9, the optical fiber of any combination of clauses 1-8, wherein the layer of graphene inhibits hydrogen ions from penetrating the carbon based coating.

Clause 10, the optical fiber of any combination of clauses 1-9, wherein the layer of graphene is electrically conductive.

Clause 11, a method to apply a graphene coating onto an optical fiber, the method including applying a first carbon based coating to an optical core of the optical fiber along a longitudinal axis of the optical fiber; focusing a laser beam at a first carbon based coating of the optical fiber; and photothermally converting a first surface of the first carbon based coating into a first layer of graphene.

Clause 12, the method of clause 11, wherein photothermally converting the first surface of the carbon based coating into the first layer of graphene comprises converting carbon atoms of the carbon based coating from having an sp3 hybridization to an sp2 hybridization.

Clause 13, the method of clauses 11 or 12, further including applying a second carbon based coating to the optical core along the longitudinal axis of the optical fiber, and photothermally converting a first surface of a second carbon based coating into a second layer of graphene, wherein the second layer of graphene is positioned in between an optical core component of the optical fiber and the first layer of graphene.

Clause 14, the method of any combination of clauses 11-13, further comprising forming a plurality of electrical components on the first layer of graphene.

Clause 15, the method of any combination of clauses 11-14, further including: photothermally converting the first surface of the first carbon based coating into a graphene electrode pattern; and forming at least one of a positive electrode and at least one of a negative electrode from the graphene electrode pattern, wherein the plurality of electrical components are formed from the at least one positive and the at least one negative graphene electrode.

Clause 16, the method of any combination of clauses 11-15, further comprising forming a power source from the plurality of electrical components, wherein the power source supplies power to a downhole tool.

Clause 17, the method of any combination of clauses 11-16, further including forming a sensor component from the plurality of electrical components, wherein the sensor component provides measurements of a downhole environment.

Clause 18, a fiber optic cable having a graphene coating, the fiber optic cable comprising a plurality of optical fibers extending along a longitudinal axis; a carbon based coating encapsulating the plurality of optical fibers along the longitudinal axis; at least one layer of material disposed on a first surface of the layer of graphene.

Clause 19, the fiber optic cable of clause 18, further comprising a plurality of electrical components formed from the layer of graphene and a first layer of the at least one layer of the material.

Clause 20, the fiber optic cable of clauses 18 or 19, wherein the layer of graphene is disposed on the first surface of the carbon based coating via a laser induction process comprising focusing a laser beam at the carbon based coating to photothermally convert carbon atoms of the carbon based coating from having an $sp^3$ hybridization to an $sp^2$ hybridization.

Unless otherwise specified, any use of any form of the terms "connect," "engage," "couple," "attach," or any other term describing an interaction between elements in the foregoing disclosure is not meant to limit the interaction to direct interaction between the elements and may also include indirect interaction between the elements described. As used herein, the singular forms "a", "an" and "the" are intended to include the plural forms as well, unless the context clearly indicates otherwise. Unless otherwise indicated, as used throughout this document, "or" does not require mutual exclusivity. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

It should be apparent from the foregoing that embodiments of an invention having significant advantages have been provided. While the embodiments are shown in only a few forms, the embodiments are not limited but are susceptible to various changes and modifications without departing from the spirit thereof.

We claim:

1. An optical fiber having a graphene coating, comprising:
   an optical core extending along a longitudinal axis;
   a carbon based coating covering the optical core along the longitudinal axis;
   a layer of graphene formed on a first surface of the carbon based coating; and
   a plurality of electrical components formed on the layer of graphene.

2. The optical fiber of claim 1, wherein the layer of graphene is formed from a laser induction process comprising focusing a laser beam at the carbon based coating to photothermally convert the first surface of the carbon based coating into the layer of graphene.

3. The optical fiber of claim 1, wherein the plurality of electrical components form a power source to provide power to a downhole tool.

4. The optical fiber of claim 1, wherein the plurality of electrical components form sensor components to provide measurements of a downhole environment.

5. The optical fiber of claim 4, wherein the sensor components are operable to measure at least one of a pressure, a temperature, a resistivity, an electromagnetic field strength and direction, an acoustic field strength, a radioactive flux, water content, and a pH of the downhole environment.

6. The optical fiber of claim 1, further comprising an intermediary layer having material properties that strengthen the optical fiber.

7. The optical fiber of claim 6, wherein the intermediary layer has insulating or semiconducting properties that isolate the optical core from one or more electrically conductive layers.

8. The optical fiber of claim 1, wherein the carbon based coating is formed from polyimides.

9. The optical fiber of claim 1, wherein the layer of graphene inhibits hydrogen ions from penetrating the carbon based coating.

10. The optical fiber of claim 1, wherein the graphene layer is electrically conductive.

11. A fiber optic cable having a graphene coating, the fiber optic cable comprising:
    a plurality of optical fibers extending along a longitudinal axis;
    a carbon based coating encapsulating the plurality of optical fibers along the longitudinal axis;
    a layer of graphene having conductive properties and disposed on a first surface of the carbon based coating; and
    at least one layer of material disposed on a first surface of the layer of graphene.

12. The fiber optic cable of claim 11, further comprising a plurality of electrical components formed from the layer of graphene and a first layer of the at least one layer of the material.

13. The fiber optic cable of claim 11, wherein the layer of graphene is disposed on the first surface of the carbon based coating via a laser induction process comprising focusing a laser beam at the carbon based coating to photothermally convert carbon atoms of the carbon based coating from having an $sp^3$ hybridization to an $sp^2$ hybridization.

14. The fiber optic cable of claim 11, further comprising a plurality of electrical components formed on the layer of graphene.

15. The fiber optic cable of claim 14, wherein the plurality of electrical components form a power source to provide power to a downhole tool.

16. The fiber optic cable of claim 14, wherein the plurality of electrical components form sensor components to provide measurements of a downhole environment.

17. The fiber optic cable of claim 16, wherein the sensor components are operable to measure at least one of a pressure, a temperature, a resistivity, an electromagnetic field strength and direction, an acoustic field strength, a radioactive flux, water content, and a pH of the downhole environment.

18. The fiber optic cable of claim 11, further comprising an intermediary layer having material properties that strengthen the optical fiber optic cable.

19. The fiber optic cable of claim 11, wherein the layer of graphene inhibits hydrogen ions from penetrating the carbon based coating.

20. The fiber optic cable of claim 11, wherein the graphene layer is electrically conductive.

* * * * *